B. HEMPSTEAD.
Cotton-Gins.
No. 143,074.
Patented September 23, 1873.
3 Sheets--Sheet 3.
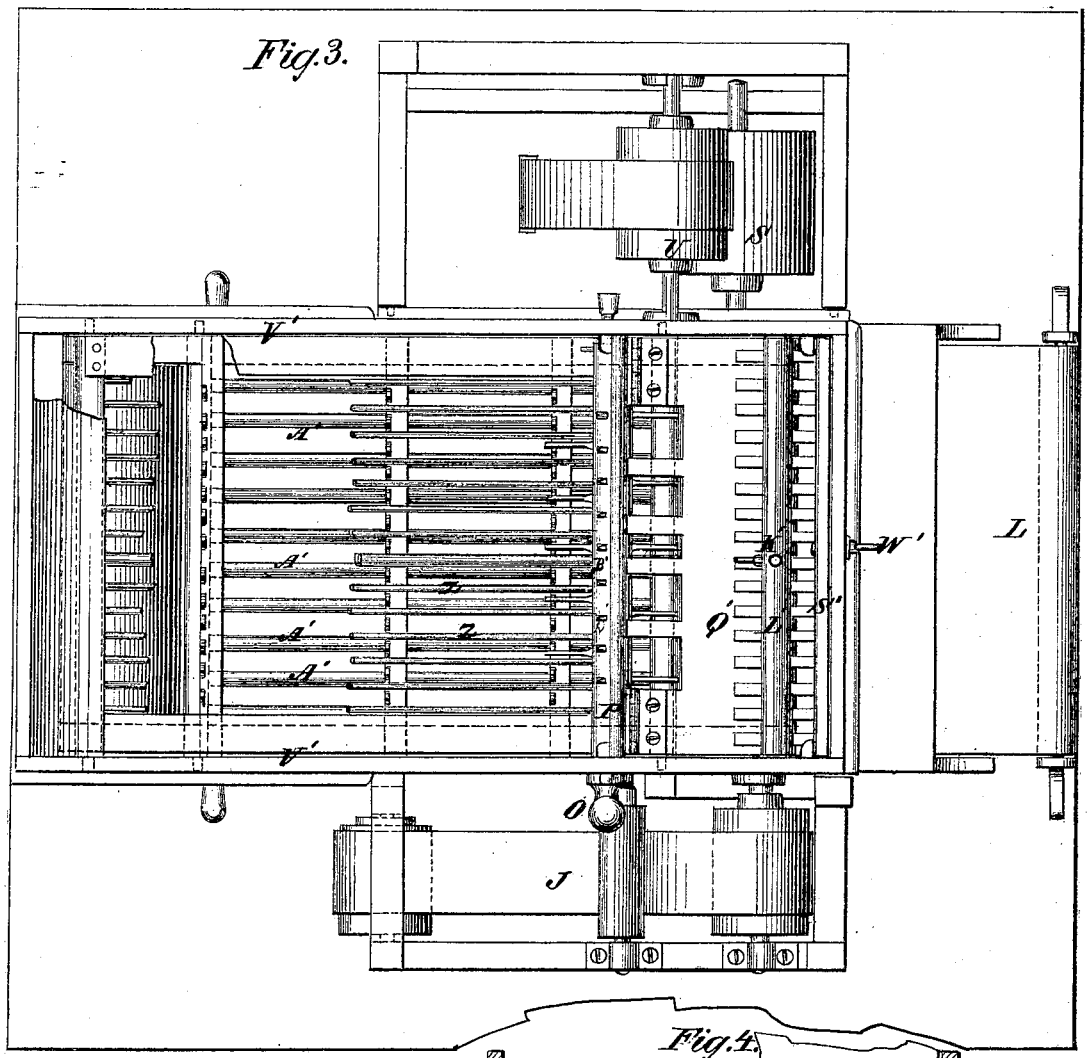
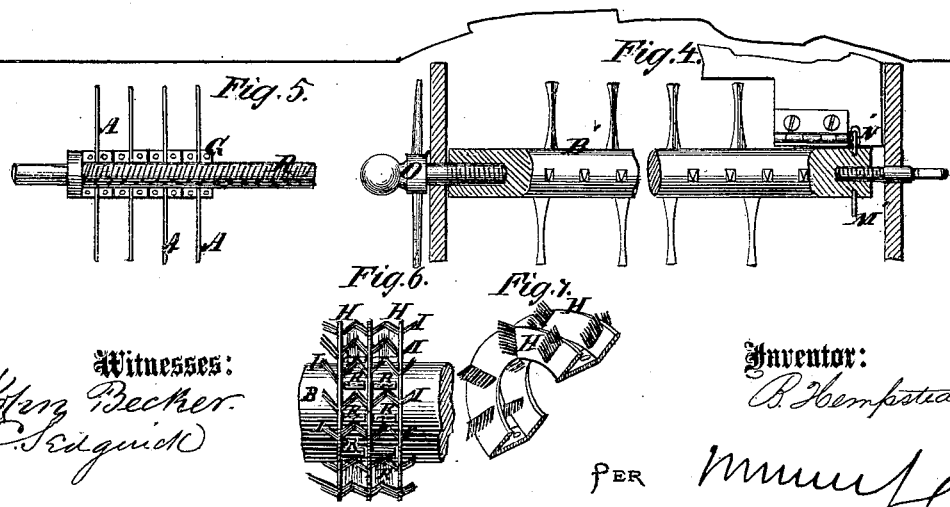
Witnesses:
John Becker
C. Sedgwick
Inventor:
B. Hempstead
per
Attorneys.

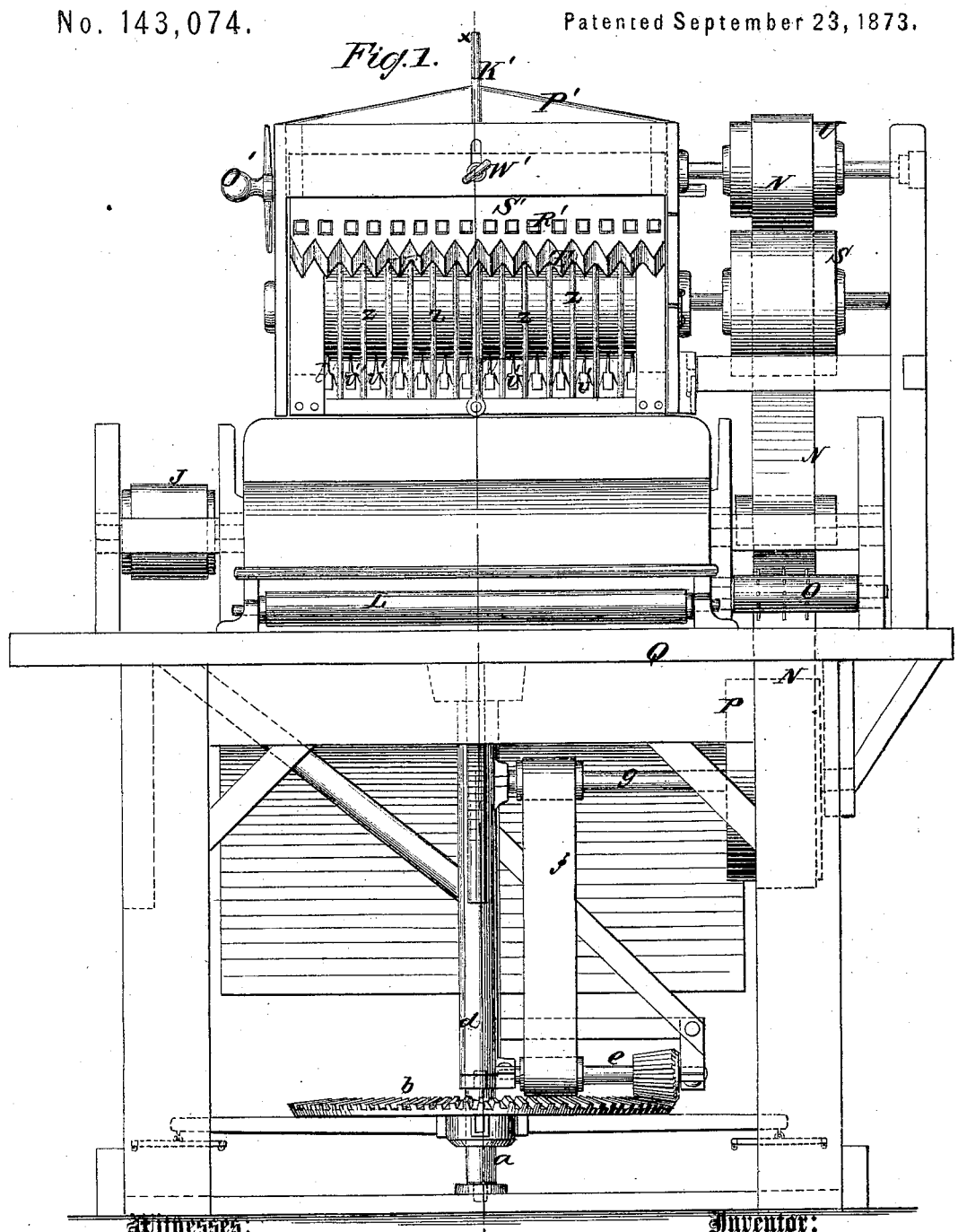

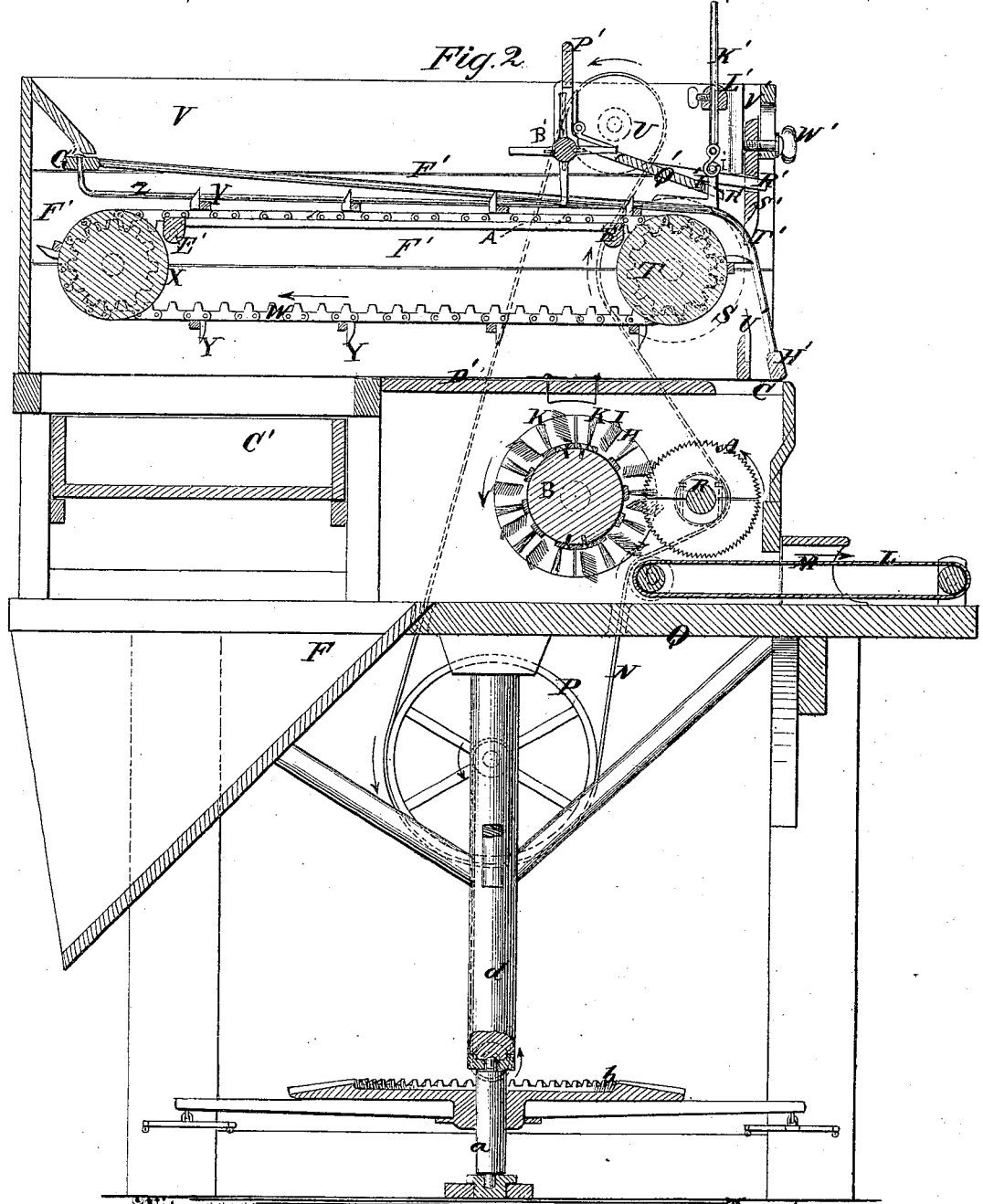

UNITED STATES PATENT OFFICE.

BEALL HEMPSTEAD, OF LITTLE ROCK, ARKANSAS.

IMPROVEMENT IN COTTON-GINS.

Specification forming part of Letters Patent No. 143,074, dated September 23, 1873; application filed January 25, 1873.

*To all whom it may concern:*

Be it known that I, B. HEMPSTEAD, of Little Rock, in the county of Pulaski and State of Arkansas, have invented a new and Improved Cotton-Gin, of which the following is a specification:

The invention consists in the improvement of cotton-gins, as hereinafter described and pointed out in the claims.

Figure 1 is a front elevation of my improved cotton-press. Fig. 2 is a longitudinal sectional elevation, taken on the line $xx$ of Fig. 1. Fig. 3 is a plan view. Fig. 4 is an elevation, partly sectional, of a feeding-gage, by which the quantity of cotton is regulated as it feeds to the saws, and some of the coarse refuse matters are expelled. Fig. 5 is a section of part of the saw-gang. Figs. 6 and 7 are detail views of the brush-roller, illustrating its construction.

Similar letters of reference indicate corresponding parts.

A represents the gin-saws, and B the brush-roller, to which the cotton is delivered, from the feeder, through the passage C in the top of the gin-case. The brush-roller B, which receives the cotton from the saws, delivers it, over the top of said roller, to the passage F, by which it is discharged from the machine. The saws are made in halves, and attached to collars G, made in halves, as shown in Fig. 5, and bolted together around the shaft to facilitate putting them on the shaft and taking them off. The brushes consist of two flanges, H, made in halves, attached together as shown in Fig. 7, and bolted together around the shaft, with brushes I attached to the sides and projecting obliquely forward, or in the direction in which they turn, and meeting together at the middle of the space between the flanges. There are, also, bristles K attached to the driver or shaft between the flanges, and projecting radially from it.

The object of having the bristles project forward is to have them impinge with greater force against the sides of the saws than they otherwise would, and prevent them from being sprung backward away from it, whereby their efficiency in removing the cotton from the saws is greatly increased.

The brush-roller is driven by the belt J from a pulley on one end of the saw-shaft. L is a wide endless carrier of canvas or other suitable material, arranged under the saws to receive the seeds and other droppings, and carry them out through the gin-case at M. This carrier and the saws are driven by the main belt N, one side of which passes from the main driving-pulley P below the floor Q, up over the roller O of the carrier-pulley R of the said arbor, pulley S on the feeder-roller T, idle-pulley U at the top, and down to the driving-pulley again. V is the hopper of the feeder, into which the cotton may be supplied by hand, or delivered from a lateral carrier or elevator extending through the floor below, where it may receive the cotton directly from the wagons to save elevating it to the gin-room by hand. W represents an endless-chain carrier in the hopper, working over the rollers T and X, with teeth Y to convey the cotton along from the place of receiving it to the passage C through the top of the gin-case; and in connection with the open wire bottom Z above the chains, the open wood bottom W below them, or either alone, and the gage B' to spread and equalize the cotton, regulate the quantity supplied to the gin, open the bolls, and remove them and other coarse matters, which are arrested by the teeth of the gage or regulator, and caused to fall, through the open bottoms, to the drawer C' and the top D' of the gin-case, from the latter of which they are carried, by the teeth Y, into the said drawer, which is removed from time to time and emptied. The open bottom of wood bars A is mounted at each end on studs E', which have bearings in the sides of the case, so arranged that the bottom can be readily removed through the side of the case, in which a door, F', is provided for the purpose, as in some cases it is desirable not to employ the said bottom. The endless carrier and its rollers can also be put in and removed through this door. The rods of the wire bottom Z are attached, at the end of the hopper where the cotton is received, to the cross-bar G', which is mounted on pivots so as to turn, and they extend along over the roller T at the delivery end of the carrier, and down to the cross-bar H' on the top of the gin-case at the outside of the passage C, into the gin-hopper. At I' this bottom is connected to a suspending-rod, K', which is vertically adjustable in its supporting-bar L', for varying the height of this end of the bottom relatively to the roller and the carrier, for varying the delivery of the cotton. In practice I will have this rod screw-threaded, and provided with a worm-wheel nut, to be turned by a horizontal crank-shaft having a worm-wheel gearing with the nut to simplify the labor of adjusting it. B' is a comb gage or regulator, consisting of several sets of comb teeth or arms projecting from a central shaft at different distances apart, the teeth of any one set, as the comb may be adjusted, projecting downward into the mass of cotton moving along the carrier to arrest the large masses, or any excess of the requisite amount, and cause it to draw and spread out evenly, and to expel the coarse matters.

For shifting the comb to bring the different sets of teeth into action it is provided with journals capable of turning, and a stop-piece, M', for each set of teeth, to bear against a rest, N', to hold it when adjusted; and one of the journals O' screws in and out of the shaft to move it endwise to allow the pins to pass the rest, and to cause them to bear against it. Above this comb is a vertical cross-board, P', provided with fingers to prevent the cotton from pressing over the comb in case it is supplied greatly in excess of the feed; and to this a guide-board, Q', is hinged at one side, a little higher than the axis of the comb, and descending therefrom nearly to the wire bottom, at a point where its bend around the roller begins, to confine the cotton to the teeth Y; and it has fingers R' extending into the vertically-adjustable plate S', for being supported at the lower edge, and adjusted relatively to the wire bottom. The plate S' has, at its lower end, coarse teeth, to keep the cotton on teeth Y, and cause them to pass between the wires to passage C. U' represents a series of teeth standing vertically in front of the roller T in such relation to the carrier as to clear the cotton from the teeth of the carrier, and cause it to pass into the gin at the passage C. The plate S' is arranged in vertical ways V', and provided with a bending-screw, W', to be adjusted and fastened in position.

To simplify the gearing by which the power is applied to the gin and carrier, and to cheapen the cost of it, I propose to dispense with the large overhead driving-wheel on a high shaft, because of cumbrous size and cost, and employ only a short shaft, $a$, with a smaller driving-wheel, $b$, with the sweeps attached to it, the upper end of the shaft being supported in a strong stationary column or shaft, $d$, suspended from the floor above, and strongly braced, and supporting the counter-shaft $e$, from which a belt, $f$, runs to another counter-shaft, $g$, above, on which the driving-pulley P is mounted. Thus I make the power apparatus much lighter and cheaper, and economize considerable power in the running of it.

Having thus described my invention, I claim as new and desire to secure by Letters Patent—

1. The arrangement of the bristles I obliquely to a plane passing through the axis of motion to bring them with greater force against the saws, and to prevent them from being sprung backward, as set forth.

2. The sectional collars G and sectional saws A, combined with the shaft R, as and for the purpose set forth.

3. The combination of the comb B', open wire bottom Z, and the carrier W Y, substantially as specified.

4. The combination of the vertically-adjustable finger-board S' with the open wire bottom Z and the carrier W Y, substantially as specified.

5. The combination of the discharging-teeth U' with the carrier W Y and the open wire bottom Z, substantially as specified.

6. The bristles arranged parallel to each other radially and in separate rows on a roll, B, as and for the purpose described.

BEALL HEMPSTEAD.

Witnesses:
E. J. BUTLER,
JOE. THOMAS.